United States Patent
Yao

(10) Patent No.: US 10,414,905 B2
(45) Date of Patent: Sep. 17, 2019

(54) RESIN COMPOSITION AND RESIN MOLDED PRODUCT

(71) Applicant: FUJI XEROX CO., LTD., Tokyo (JP)

(72) Inventor: Kenji Yao, Minamiashigara (JP)

(73) Assignee: FUJI XEROX CO., LTD., Tokyo (JP)

( * ) Notice: Subject to any disclaimer, the term of this patent is extended or adjusted under 35 U.S.C. 154(b) by 36 days.

(21) Appl. No.: 15/642,722

(22) Filed: Jul. 6, 2017

(65) Prior Publication Data

US 2018/0230296 A1    Aug. 16, 2018

(30) Foreign Application Priority Data

Feb. 10, 2017 (JP) .................................. 2017-023424

(51) Int. Cl.
| | |
|---|---|
| C08L 1/14 | (2006.01) |
| C08K 5/00 | (2006.01) |
| C08K 5/10 | (2006.01) |
| C08L 67/04 | (2006.01) |

(52) U.S. Cl.
CPC .............. C08L 1/14 (2013.01); C08K 5/0016 (2013.01); C08K 5/10 (2013.01); C08L 67/04 (2013.01)

(58) Field of Classification Search
CPC ......... C08L 1/14; C08L 67/04; C08K 5/0016; C08K 5/10
See application file for complete search history.

(56) References Cited

U.S. PATENT DOCUMENTS

| | | | | |
|---|---|---|---|---|
| 5,292,783 A * | 3/1994 | Buchanan | ................. | C08L 1/10 524/37 |
| 5,625,029 A * | 4/1997 | Hubbs | .................... | C08G 63/08 528/354 |
| 7,098,292 B2 * | 8/2006 | Zhao | ....................... | A61F 13/26 264/176.1 |
| 7,235,621 B2 * | 6/2007 | Nakashima | ............. | C12P 7/625 435/232 |
| 2011/0152818 A1 | 6/2011 | Wang et al. | | |
| 2012/0015142 A1 | 1/2012 | Lee et al. | | |
| 2014/0076196 A1 * | 3/2014 | Kawashima | ............ | C08L 67/04 106/203.1 |
| 2016/0090473 A1 * | 3/2016 | Yao | .......................... | C08L 1/10 524/40 |
| 2017/0081505 A1 | 3/2017 | Yao et al. | | |

FOREIGN PATENT DOCUMENTS

| | | |
|---|---|---|
| JP | 2016-069423 A | 5/2016 |
| WO | 96/08535 A1 | 3/1996 |

OTHER PUBLICATIONS

Scandola et al., "Miscibility of Bacterial Poly(3-Hydroxybutyrate) With Cellulose Esters" Macromolecules, American Chemical Society, US, vol. 25, No. 24, Nov. 23, 1992 Nov. 23, 1992), pp. 6441-6446.*
Dec. 22, 2017 Extended Search Report issued in European Patent Application No. 17183073.0.
Scandola, M., et al. "Miscibility of Bacterial Poly(3-Hydroxybutyrate) With Cellulose Esters" Macromolecules, American Chemical Society, US, vol. 25, No. 24, Nov. 23, 1992 (Nov. 23, 1992), pp. 6441-6446.
Ceccorulli, G., et al. "Effect of a Low Molecular Weight Plasticizer on the Thermal and Viscoelastic Properties of Miscible Blends of Bacterial Poly(3-Hydroxybutyrate) With Cellulose Acetate Butyrate", Macromolecules, American Chemical Society, vol. 26, No. 25, (1993), pp. 6722-6726.
Zibiao Li, et al. "Polyhydroxyalkanoates: Opening Doors for a Sustainable Future", NPG Asia Materials, vol. 8, No. 4, Apr. 22, 2016 (Apr. 22, 2016), e265, pp. 1-20.

* cited by examiner

*Primary Examiner* — Satya B Sastri
(74) *Attorney, Agent, or Firm* — Oliff PLC

(57) ABSTRACT

A resin composition includes: a cellulose acetate propionate including a propionyl group; and a polyhydroxyalkanoate, wherein a mass ratio (B)/(A) ranges from 0.2 to 4, wherein (B) represents a content of the polyhydroxyalkanoate in a total amount of the resin composition and (A) represents a content of the cellulose acetate propionate in the total amount of the resin composition, and a content of the propionyl group in the cellulose acetate propionate ranges from 39% by mass to 51% by mass.

12 Claims, No Drawings

RESIN COMPOSITION AND RESIN MOLDED PRODUCT

CROSS-REFERENCE TO RELATED APPLICATIONS

This application is based on and claims a priority under 35 USC 119 from Japanese Patent Application No. 2017-023424 filed on Feb. 10, 2017.

BACKGROUND

Technical Field

The present invention relates to a resin composition and a resin molded product.

Related Art

Various resin compositions have conventionally been provided and used in a variety of applications. Resin compositions have been used particularly for various parts or casings of household electric appliances or automobiles. Further, thermoplastic resins have been used for parts such as casings of business machines or electronic or electric apparatuses.

Resins derived from plants have recently been utilized and one of conventionally-known resins derived from plants is a cellulose derivative.

SUMMARY

An aspect of the invention is a resin composition, comprising:
a cellulose acetate propionate including a propionyl group; and
a polyhydroxyalkanoate,
wherein a mass ratio (B)/(A) ranges from 0.2 to 4, wherein (B) represents a content of the polyhydroxyalkanoate in a total amount of the resin composition and (A) represents a content of the cellulose acetate propionate in the total amount of the resin composition, and
a content of the propionyl group in the cellulose acetate propionate ranges from 39% by mass to 51% by mass.

DETAILED DESCRIPTION

Embodiments as examples of the resin composition and the resin molded product according to the invention will hereinafter be described.
<Resin Composition>

The resin composition according to the present embodiment contains a cellulose acetate propionate and a polyhydroxyalkanoate. The cellulose acetate propionate has a propionyl content, in the cellulose acetate propionate, in a range from 39% by mass to 51% by mass. A mass ratio of a polyhydroxyalkanoate content (B) to a cellulose acetate propionate content (A) ((B)/(A)), each in the total amount of the resin composition, is in a range from 0.2 to 4.

A cellulose acylate (acylated cellulose derivative) obtained by substituting some of the hydroxyl groups by an acyl group is made of a non-edible resource and a primary derivative not requiring chemical polymerization so that it is an eco-friendly resin material. In addition, it has a strong hydrogen bonding property so that it has a high modulus of elasticity as a resin material. Due to strong hydrogen bonding, however, it has poor thermoplasticity. When injection molding is performed using the cellulose acylate, the resulting molded product is sometimes colored by increase of a temperature to permit injection molding and inevitable application of a mechanical load.

Japanese Patent Laid-Open No. 2016-069423 (Patent Document 1) discloses a technology of using a resin composition containing a cellulose ester, an adipic acid ester, and a polyhydroxyalkanoate to reduce the molding or forming temperature and reduce a mechanical load, and thereby obtaining a coloration-reduced molded product. The resin molded product obtained from the resin composition disclosed in Patent Document 1 however has low flexibility so that it does not always have a high tensile elongation at break.

The resin molded product has an improved tensile elongation at break by having therein a large amount (for example, 20% by mass or more) of a plasticizer or having a rubber material, but it sometimes has a reduced modulus in tension. Therefore, it is sometimes difficult to use conventional resin compositions for obtaining therefrom a resin molded product having, for example, a fitting member (for example, snap-fit member), screw hole, or the like.

On the other hand, a resin molded product having an improved tensile elongation at break while having a less reduced modulus in tension can be obtained from the resin composition of the present embodiment having the above-described constitution. The reason for it is not clear but is presumed to be as follows.

With regard to the cellulose acetate propionate, when the cellulose acetate propionate has a propionyl content in a range from 39% by mass to 51% by mass, the molecule of the polyhydroxyalkanoate is likely to enter between the molecules of the cellulose acetate propionate. Further, a reduction in the intermolecular force of the cellulose acetate propionate is likely to be suppressed. Therefore, a continuous phase is presumed to be formed between the cellulose acetate propionate and the polyhydroxyalkanoate. It is presumed that as a result, the intermolecular force of the cellulose suppresses a reduction in the modulus in tension and the polyhydroxyalkanoate improves the tensile elongation at break.

In addition, when a ratio of a polyhydroxyalkanoate content (B) to a cellulose acetate propionate content (A) ((B)/(A)) (mass ratio) is less than 0.2, an effect of improving the tensile elongation at break lowers. When the ratio ((B)/(A)) is more than 4, on the other hand, the modulus in tension decreases. This is presumed to occur by the following reason.

The elastic modulus of the cellulose acetate propionate is relatively high, while that of the polyhydroxyalkanoate (PHA) is low. On the other hand, the tensile elongation of the cellulose acetate propionate is small, while that of the polyhydroxyalkanoate is large in an amorphous form and small in crystal form. The polyhydroxyalkanoate has a high crystallization rate so that it usually decreases the tensile elongation at break. It is presumed that in the present embodiment, on the other hand, a high elastic modulus can be maintained because uniform insertion of the polyhydroxyalkanoate between the molecules of the cellulose acetate propionate inhibits crystallization, improves the tensile elongation at break, and enables considerably uniform dispersion of them and the intermolecular force of the cellulose acetate propionate therefore remains.

It is therefore presumed that from the resin composition of the present embodiment having the above-described constitution, a resin molded product having an improved tensile elongation at break while having a less reduced modulus in tension can be obtained.

A resin molded product having an improved tensile elongation at break while having a less reduced modulus in tension can be obtained from the resin composition of the present embodiment so that it is suited for use in a resin molded product having, for example, a fitting member (for example, a snap-fit member) or a screw hole.

The components of the resin composition according to the present embodiment will hereinafter be described specifically.

[Cellulose Acetate Propionate]

The resin composition according to the present embodiment contains a cellulose acetate propionate whose propionyl content in the cellulose acetate propionate is in a range from 39% by mass to 51% by mass.

The cellulose acetate propionate described herein is a cellulose derivative obtained by substituting some of the hydroxyl groups thereof by acetyl and propionyl groups. It is more specifically, a cellulose derivative represented by the following formula (1):

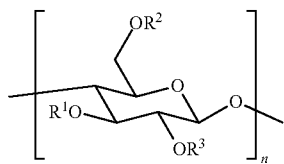

Formula (1)

In the formula (1), $R^1$, $R^2$, and $R^3$ each independently represent a hydrogen atom, an acetyl group, or a propionyl group; n stands for an integer of 2 or more, with the proviso that at least some of n pieces of $R^1$, n pieces of $R^2$, and n pieces of $R^3$ represent an acetyl group and a propionyl group.

In the formula (1), the range of n is not particularly limited and it may be determined, depending on the range of a weight average molecular weight. For example, the range of n is from 50 to 300.

—Weight Average Molecular Weight—

The weight average molecular weight of the acetyl propionyl cellulose preferably ranges from 10000 to 100000, more preferably ranges from 30000 to 80000 because within this range, a resin molded product having an improved tensile elongation at break while having a less reduced modulus in tension can be obtained.

The weight average molecular weight (Mw) is determined in terms of polystyrene by a gel permeation chromatography apparatus (GPC apparatus: product of TOSOH, HLC-8320GPC, column: TSKgelα-M) while using a 90:10 (dimethyl acetamide):(lithium chloride) solution.

—Propionyl Content—

With regard to the cellulose acetate propionate, the cellulose acetate propionate has a propionyl content in a range from 39% by mass to 51% by mass. The content is preferably in a range from 40% by mass to 50% by mass, more preferably in a range from 41% by mass to 49% by mass, because within this range, a resin molded product having a more improved tensile elongation at break while having a less reduced modulus in tension can be obtained.

—Acetyl Content—

With regard to the cellulose acetate propionate, the cellulose acetate propionate has an acetyl content preferably in a range from 0.1% by mass to 10% by mass, more preferably in a range from 0.5% by mass to 5% by mass, because within this range, a resin molded product having a more improved tensile elongation at break while having a less reduced modulus in tension can be obtained.

—A Ratio of Acetyl Content to Propionyl Content—

Supposing that a propionyl content by mass is ($M_{Pr}$) and an acetyl content by mass is ($M_{Ac}$), a mass ratio of an acetyl content ($M_{Pr}$) to a propionyl content ($M_{Pr}$) (($M_{Ac}$)/($M_{Pr}$)) preferably ranges from 0.005 to 0.1, more preferably ranges from 0.01 to 0.07. When the mass ratio of them falls within the above-described range, a resin molded product having a more improved tensile elongation at break while having a less reduced modulus in tension can be obtained.

The propionyl content and the acetyl content can be found by the following method.

They are calculated from the integrated value of an acetyl-derived peak, a propionyl-derived peak, and a hydroxyl-derived peak in $H^1$-NMR.

From the propionyl content and acetyl content found by this method, their mass ratio (($M_{Ac}$)/($M_{Pr}$)) is determined.

A process for producing the cellulose acetate propionate is not particularly limited and examples include a process of performing acylation, molecular weight reduction (depolymerization), and if necessary deacetylation of a cellulose. It may be produced by subjecting a commercially available product of cellulose acetate propionate to molecular weight reduction (depolymerization) such that it has a predetermined weight average molecular weight.

[Polyhydroxyalkanoate]

The resin composition according to the present embodiment contains a polyhydroxyalkanoate. Specific examples of the polyhydroxyalkanoate include a resin having a chemical structure represented by the following formula (2).

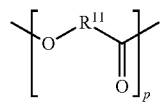

Formula (2)

(in the formula (2), $R^{11}$ represents an alkylene group having 1 to 10 carbon atoms and p stands for an integer of 2 or more).

In the formula (2), the alkylene group represented by $R^{11}$ is desirably an alkylene group having 3 to 6 carbon atoms. The alkylene group represented by $R^{11}$ may be either linear or branched, but is preferably branched from the standpoint of obtaining a resin molded product having an improved tensile elongation at break while having a less reduced modulus in tension.

In the formula (2), $R^{11}$ represents an alkylene group, which means that 1) any of $R^{11}$s represents the same alkylene group and has an [O—$R^{11}$—C(=O)—] structure or 2) $R^{11}$s represent different alkylene groups ($R^{11}$ s represent groups different in carbon number or branch), respectively and have a plurality of [O—$R^{11}$—C(=O)—] structures (that is, [O—$R^{11A}$—C(=O)—] and [O—$R^{11B}$—C(=O)—] structures).

This means that the polyhydroxyalkanoate may be a homopolymer of one hydroxyalkanoate (hydroxyalkanoic acid) or a copolymer of two or more species of hydroxyalkanoates (hydroxyalkanoic acids).

In the formula (2), the upper limit of p is not particularly limited and is, for example, 20000 or less. From the standpoint of obtaining a resin molded product having an improved tensile elongation at break while having a less reduced modulus in tension, p preferably ranges from 500 to 10000, more preferably ranges from 1000 to 8000.

Examples of the hydroxyalkanoic acid constituting the polyhydroxyalkanoate include lactic acid, 2-hydroxybutyric acid, 3-hydroxybutyric acid, 4-hydroxybutyric acid, 2-hydroxy-3-methylbutyric acid, 2-hydroxy-3,3-dimethylbutyric acid, 3-hydroxyvaleric acid, 4-hydroxyvaleric acid, 5-hydroxyvaleric acid, 3-hydroxyhexanoic acid, 2-hydroxycaproic acid, 2-hydroxyisocaproic acid, 6-hydroxycaproic acid, 3-hydroxypropionic acid, 3-hydroxy-2,2-dimethylpropionic acid, 3-hydroxyhexanoic acid, and 2-hydroxy-n-octanoic acid.

Of these, the polyhydroxyalkanoate is preferably a copolymer between a branched hydroxyalkanoic acid having 2 to 4 carbon atoms and a branched hydroxyalkanoic acid having 5 to 7 carbon atoms (with the proviso that the number of carbon atoms include the number of carbon atoms of the carboxy group). In particular, a copolymer between 3-hydroxybutyric acid and 3-hydroxycaproic acid (a copolymer between 3-hydroxybutyrate and 3-hydroxyhexanoate) is more preferred.

When the polyhydroxyalkanoate is the copolymer between 3-hydroxybutyrate and 3-hydroxyhexanoate, a composition ratio of the 3-hydroxyhexanoate to the copolymer of the 3-hydroxybutyrate and the 3-hydroxyhexanoate preferably ranges from 3 mol % to 20 mol %, more preferably ranges from 4 mol % to 15 mol % or less, still more preferably ranges from 5 mol % to 12 mol %. The copolymerization percentage of 3-hydroxyhexanoate falling within a range from 3 mol % to 20 mol % facilitates production of a resin molded product having an improved tensile elongation at break while having a less reduced modulus in tension.

The composition ratio of the 3-hydroxyhexanoate to the copolymer of the 3-hydroxybutyrate and 3-hydroxyhexanoate is determined in the following manner.

The composition ratio of the 3-hydroxyhexenoate to the copolymer of the 3-hydroxybutyrate and 3-hydroxyhexanoate is determined by measuring the $H^1$-NMR spectrum of the copolymer, calculating the integral of a peak of the terminal H of hexenoate and the integral of a peak of the terminal H of butyrate, and then calculating a ratio of hexanoate to the total of butyrate and hexanoate.

The weight average molecular weight (Mw) of the polyhydroxyalkanoate preferably ranges from 10,000 to 1,000,000, more preferably ranges from 50,000 to 800,000, still more preferably ranges from 100,000 to 600,000.

The polyhydroxyalkanoate having a weight average molecular weight (Mw) within the above-described range facilitates production of a resin molded product having an improved tensile elongation at break, while having a less reduced modulus in tension.

The weight average molecular weight (Mw) of the polyhydroxyalkanoate is determined by gel permeation chromatograph (GPC). More specifically, the molecular weight determination by GPC is performed in a chloroform solvent by using, as a measuring device, "HPLC 1100", product of TOSOH and, as a column, TSKgel GMHHR-M+TSKgel GMHHR-M (7.8 mm I.D.×30 cm), product of TOSOH. The weight average molecular weight is calculated using a molecular weight calibration curve drawn using a monodisperse polystyrene standard sample based on the above determination results.

Specific examples of the polyhydroxyalkanoate are shown in the following Table 1, but it is not limited to them.

TABLE 1

| | Compound name | Trade name | Product of: |
|---|---|---|---|
| PHA-1 | Poly(3-hydroxybutyrate-co-3-hydroxyhexanoate) [copolymer between 3-hydroxybutyric acid and 3-hydroxycaproic acid] | AONILEX | Kaneka |
| PHA-2 | Polylactic acid | TERRAMAC TE2000 | UNITIKA |
| PHA-3 | Poly(3-hydroxybutyrate-co-3-hydroxyvalerate) [copolymer between 3-hydroxybutyric acid and 3-hydroxyvaleric acid] | BIOPOL | Zeneca |
| PHA-3 | Poly(3-hydroxybutyrate) [homopolymer of 3-hydroxybutyric acid] | BIOPOL | Zeneca |

[(Polyhydroxyalkanoate)/(Cellulose Acetate Propionate) Mass Ratio]

A mass ratio (B)/(A), wherein (A) represents the content of the cellulose acetate propionate in a total amount of the resin composition and (B) represents the content of polyhydroxyalkanoate in the total amount of the resin composition, ranges from 0.2 to 4. The mass ratios (B)/(A) within the above-described range facilitate production of a resin molded product having an improved tensile elongation at break while having a less reduced modulus in tension. The (B)/(A) preferably ranges from 0.3 to 3, more preferably ranges from 0.3 to 2.

[Contents of Cellulose Acetate Propionate and Polyhydroxyalkanoate]

The cellulose acetate propionate content preferably ranges from 15% by mass to 85% by mass because this range facilitates production of a resin molded product having an improved tensile elongation at break while having a less reduced modulus in tension. The preferable lower limit of the cellulose acetate propionate content is preferably 20% by mass or more, more preferably 25% by mass or more, each based on the total amount of the resin composition. A preferable upper limit of the cellulose acetate propionate is preferably 80% by mass or less, more preferably 75% by mass or less.

From the similar standpoint, the polyhydroxyalkanoate content preferably ranges from 15% by mass to 85% by mass based on the total amount of the resin composition. The lower limit of the polyhydroxyalkanoate content is preferably 20% by mass or more, more preferably 25% by mass or more, each based on the total amount of the resin composition. The upper limit of the polyhydroxyalkanoate content is preferably 80% by mass or less, more preferably 75% by mass or less.

The total content of the cellulose acetate propionate and the polyhydroxyalkanoate content based on the total amount of the resin composition is preferably 90% by mass or more, more preferably 95% by mass or more. It may be 100% by mass.

[Other Components]
(Plasticizer)

The resin composition according to the present embodiment may further contain a plasticizer.

Examples of the plasticizer include a composition containing adipic acid ester; and polyether ester compounds, condensed phosphoric acid ester compounds, sebacic acid ester compounds, glycol ester compounds, acetic acid ester compounds, dibasic acid ester compounds, phosphoric acid ester compounds, phthalic acid ester compounds, camphor, citric acid ester compounds, stearic acid ester compounds, metal soaps, polyol compounds, and polyalkylene oxide compounds.

Of these, the plasticizer preferably is a composition containing adipic acid ester and polyether ester compounds are preferred, and more preferably is a composition containing adipic acid ester.

—Composition Containing Adipic Acid Ester—

The composition containing adipic acid ester are composition composed only of an adipic acid ester or mixtures between an adipic acid ester and a component other than the adipic acid ester (a compound different from the adipic acid ester). The composition contains preferably 50% by mass or more of an adipic acid ester based on all the composition.

Examples of the adipic acid ester include adipic acid diesters and adipic acid polyesters. Specific examples include adipic acid diesters represented by the following formula (AE-1) and adipic acid polyesters represented by the following formula (AE-2).

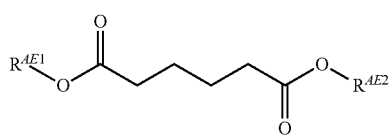

Formula (AE-1)

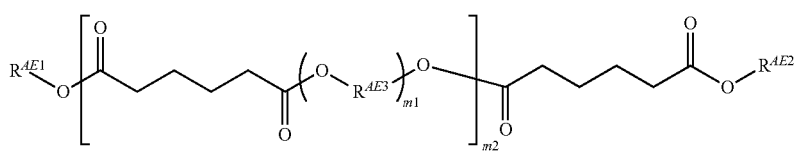

Formula (AE-2)

In the formulas (AE-1) and (AE-2), $R^{AE1}$ and $R^{AE2}$ each independently represent an alkyl group or a polyoxyalkyl group $[-(C_xH_{2x}-O)_y-R^{41}]$ (wherein, $R^{41}$ represents an alkyl group, x stands for an integer of 1 to 6, and y stands for an integer of 1 to 6);

$R^{AE3}$ represents an alkylene group;

m1 stands for an integer of 1 to 5; and m2 stands for an integer of 1 to 10.

In the formulas (AE-1) and (AE-2), the alkyl group represented by $R^{AE1}$ or $R^{AE2}$ is preferably an alkyl group having 1 to 6 carbon atoms, with the alkyl group having 1 to 4 carbon atoms being more preferred. The alkyl group represented by $R^{AE1}$ or $R^{AE2}$ may be any of linear, branched, or cyclic, but is preferably linear or branched.

In the formulas (AE-1) and (AE-2), the alkyl group represented by $R^{41}$ in the polyoxyalkyl group $[-(C_xH_{2x}-O)_y-R^{41}]$ represented by $R^{AE1}$ or $R^{AE2}$ is preferably an alkyl group having 1 to 6 carbon atoms, with the alkyl group having 1 to 4 carbon atoms being more preferred. The alkyl group represented by $R^{41}$ may be any of linear, branched, or cyclic, but is preferably linear or branched. In the above formula, x stands for an integer of 1 to 6 and y stands for an integer of 1 to 6.

The alkylene group represented by $R^{AE3}$ in the formula (AE-2) is preferably an alkylene group having 1 to 6 carbon atoms, with the alkylene group having 1 to 4 carbon atoms being more preferred. The alkylene group may be any of linear, branched, or cyclic, but is preferably linear or branched.

In the formulas (AE-1) and (AE-2), groups represented by the symbol may be substituted with a substituent. Examples of the substituent include alkyl groups, aryl groups, and hydroxyl groups.

The molecular weight (or weight average molecular weight) of the adipic acid ester preferably ranges from 100 to 10000, more preferably ranges from 200 to 3000. The weight average molecular weight is a value obtained by a method similar to the above-described method used for the determination of the weight average molecular weight of the polyether ester compound.

Specific examples of the composition containing adipic acid ester-are shown in the following Table 2 but are not limited to them.

TABLE 2

| Compound name | Trade name | Product of: |
| --- | --- | --- |
| ADP1 | Adipic acid diester | Daifatty 101 | Daihachi Chemical Industry |

TABLE 2-continued

| Compound name | Trade name | Product of: |
| --- | --- | --- |
| ADP2 | Adipic acid diester | ADK CIZER RS-107 | ADEKA |
| ADP3 | Adipic acid polyester | Polycizer W-230-H | DIC |

—Polyether Ester Compound—

Specific examples of the polyether ester compound include polyether ester compounds represented by the formula (EE).

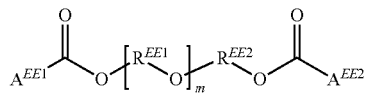

Formula (EE)

In the formula (EE), $R^{EE1}$ and $R^{EE2}$ each independently represent an alkylene group having 2 to 10 carbon atoms; $A^{EE1}$ and $A^{EE2}$ each independently represent an alkyl group having 1 to 6 carbon atoms, an aryl group having 6 to 12 carbon atoms, or an aralkyl group having 7 to 18 carbon atoms; and m stands for an integer of 1 or more.

In the formula (EE), the alkylene group represented by $R^{EE1}$ is preferably an alkylene group having 3 to 10 carbon atoms, more preferably an alkylene group having 3 to 6 carbon atoms. The alkylene group represented by $R^{EE1}$ may be any of linear, branched or cyclic, but is preferably linear.

A resin composition obtained using as $R^{EE1}$ an alkylene group having 3 or more carbon atoms is likely to exhibit thermoplasticity because deterioration in flowability is suppressed. When the alkylene group represented by $R^{EE1}$ has 10 or less carbon atoms or the alkylene group represented by $R^{EE1}$ is linear, affinity to the cellulose acetate propionate is easily enhanced. A resin composition obtained by using, as $R^{EE1}$, a linear alkylene group and controlling the number of carbon atoms to fall within the above-described range has improved moldability or formability.

From such standpoints, the alkylene group represented by $R^{EE1}$ is preferably an n-hexylene group ($-(CH_2)_6-$). This means that the polyether ester compound is preferably a compound having, as $R^{EE1}$, an n-hexylene group ($-(CH_2)_6-$).

In the formula (EE), the alkylene group represented by $R^{EE2}$ is preferably an alkylene group having 3 to 10 carbon atoms, more preferably an alkylene group having 3 to 6 carbon atoms. The alkylene group represented by $R^{EE2}$ may be any of linear, branched or cyclic and is preferably linear.

A resin composition obtained using as $R^{EE2}$ an alkylene group having 3 or more carbon atoms is likely to have less reduced flowability and exhibit thermoplasticity. A resin composition obtained using as $R^{EE2}$ an alkylene group having 10 or less carbon atoms or a linear alkylene group is likely to have enhanced affinity to the cellulose acetate propionate. A resin composition having, as $R^{EE2}$, a linear alkylene group having carbon atoms within the above-described range can therefore have improved moldability or formability.

From such standpoints, the alkylene group represented by $R^{EE2}$ is particularly preferably an n-butylene group ($-(CH_2)_4-$). This means that the polyether ester compound is preferably a compound having, as $R^{EE2}$, an n-butylene group ($-(CH_2)_4-$).

In the formula (EE), the alkyl group represented by $A^{EE1}$ or $A^{EE2}$ is preferably an alkyl group having 1 to 6 carbon atoms, with the alkyl group having 2 to 4 carbon atoms being more preferred. The alkyl group represented by $A^{EE1}$ or $A^{EE2}$ may be any of linear, branched, or cyclic, but is more preferably branched.

The aryl group represented by $A^{EE1}$ or $A^{EE2}$ is an aryl group having 6 to 12 carbon atoms and examples of it include unsubstituted aryl groups such as phenyl group and naphthyl group and substituted phenyl groups such as t-butylphenyl group and hydroxyphenyl group.

The aralkyl group represented by $A^{EE1}$ or $A^{EE2}$ is a group represented by $-R^A$-Ph, in which $R^A$ represents a linear or branched alkylene group having 1 to 6 carbon atoms (preferably 2 to 4 carbon atoms); Ph represents an unsubstituted phenyl group or a phenyl group substituted by a linear or branched alkyl group having 1 to 6 carbon atoms (preferably, 2 to 6 carbon atoms). Specific examples of the aralkyl group include unsubstituted aralkyl groups such as benzyl group, phenylmethyl group (phenethyl group), phenylpropyl group, and phenylbutyl group and substituted aralkyl groups such as methylbenzyl group, dimethylbenzyl group, and methylphenethyl group.

At least one of $A^{EE1}$ and $A^{EE2}$ represents preferably an aryl group or an aralkyl group. This means that the polyether ester compound is preferably a compound having, as at least one of $A^{EE1}$ and $A^{EE2}$, an aryl group (preferably, a phenyl group) or an aralkyl group, preferably a compound having, as both of $A^{EE1}$ and $A^{EE2}$, an aryl group (preferably, a phenyl group) or an aralkyl group.

The properties of the polyether ester compound will next be described.

The polyether ester compound has a weight average molecular weight (Mw) preferably ranging from 450 to 650, more preferably ranging from 500 to 600.

When the polyether ester compound having a weight average molecular weight (Mw) of 450 or more is used, bleeding (precipitating phenomenon) hardly occurs. When the polyether ester compound having a weight average molecular weight (Mw) of 650 or less is used, affinity to the cellulose acetate propionate is enhanced. By using the polyether ester compound having a weight average molecular weight (Mw) falling within the above-described range, therefore, the resulting resin composition has improved moldability or formability.

The weight average molecular weight (Mw) of the polyether ester compound is a value determined by gel permeation chromatograph (GPC). More specifically, the molecular weight determination by GPC is performed in a chloroform solvent by using, as a measuring device, "HPLC1100", product of TOSOH and, as a column, TSKgel GMHHR-M+TSKgel GMHHR-M (7.8 mm I.D.×30 cm), product of TOSOH.

The weight average molecular weight is calculated using a molecular weight calibration curve drawn using a monodisperse polystyrene standard sample based on the above determination results.

The polyether ester compound has a viscosity at 25° C. ranging from 35 mPa·s to 50 mPa·s, more preferably ranging from 40 mPa·s to 45 mPa·s.

When the polyether ester compound having a viscosity of 35 mPa·s or more is used, improved dispersibility in the cellulose acetate propionate can easily be achieved. When the polyether ester compound having a viscosity of 50 mPa·s or less is used, anisotropy in the dispersion of the polyether ester compound hardly occurs. The resin composition obtained by using the polyether ester compound having a viscosity falling within the above-described range has improved moldability or formability.

The viscosity is a value determined by an E type viscometer.

The polyether ester compound has a solubility parameter (SP value) preferably ranging from 9.5 to 9.9, more preferably ranging from 9.6 to 9.8.

When the polyether ester compound has a solubility parameter (SP value) ranging from 9.5 to 9.9, dispersibility in the cellulose acetate propionate can improve easily.

The solubility parameter (SP value) is calculated by the method of Fedor. More specifically, the solubility parameter (SP value) is calculated, for example, by the following equation in accordance with the description in Polym. Eng. Sci., vol. 14, p. 147 (1974). Equation: SP value=$\sqrt{(Ev/v)}$=$\sqrt{(\Sigma\Delta ei/\Sigma\Delta vi)}$ (wherein, Ev: evaporation energy (cal/mol), v: molar volume (cm$^3$/mol), $\Delta ei$: evaporation energy (cal/mol) of each atom or atomic group, and $\Delta vi$: molar volume of each atom or atomic group).

The solubility parameter (SP value) employs (cal/cm$^3$)$^{1/2}$ as a unit, but is described in a dimensionless manner without the unit in conformity with practices.

Specific examples of the polyether ester compound are shown in the following Table 3, but the compound is not limited to them.

TABLE 3

| | $R^{EE1}$ | $R^{EE2}$ | $A^{EE1}$ | $A^{EE2}$ | Mw | Viscosity (25° C.) | APHA | SP value |
|---|---|---|---|---|---|---|---|---|
| PEE1 | —(CH$_2$)$_6$— | —(CH$_2$)$_4$— | Phenyl group | Phenyl group | 550 | 43 | 120 | 9.7 |
| PEE2 | —(CH$_2$)$_2$— | —(CH$_2$)$_4$— | Phenyl group | Phenyl group | 570 | 44 | 115 | 9.4 |
| PEE3 | —(CH$_2$)$_{10}$— | —(CH$_2$)$_4$— | Phenyl group | Phenyl group | 520 | 48 | 110 | 10.0 |
| PEE4 | —(CH$_2$)$_6$— | —(CH$_2$)$_2$— | Phenyl group | Phenyl group | 550 | 43 | 115 | 9.3 |
| PEE5 | —(CH$_2$)$_6$— | —(CH$_2$)$_{10}$— | Phenyl group | Phenyl group | 540 | 45 | 115 | 10.1 |
| PEE6 | —(CH$_2$)$_6$— | —(CH$_2$)$_4$— | t-Butyl group | t-Butyl group | 520 | 44 | 130 | 9.7 |
| PEE7 | —(CH$_2$)$_6$— | —(CH$_2$)$_4$— | Phenyl group | Phenyl group | 460 | 45 | 125 | 9.7 |
| PEE8 | —(CH$_2$)$_6$— | —(CH$_2$)$_4$— | Phenyl group | Phenyl group | 630 | 40 | 120 | 9.7 |
| PEE9 | —(CH$_2$)$_6$— | —(CH$_2$)$_4$— | Phenyl group | Phenyl group | 420 | 43 | 135 | 9.7 |
| PEE10 | —(CH$_2$)$_6$— | —(CH$_2$)$_4$— | Phenyl group | Phenyl group | 670 | 48 | 105 | 9.7 |
| PEE11 | —(CH$_2$)$_6$— | —(CH$_2$)$_4$— | Phenyl group | Phenyl group | 550 | 35 | 130 | 9.7 |
| PEE12 | —(CH$_2$)$_6$— | —(CH$_2$)$_4$— | Phenyl group | Phenyl group | 550 | 49 | 125 | 9.7 |
| PEE13 | —(CH$_2$)$_6$— | —(CH$_2$)$_4$— | Phenyl group | Phenyl group | 550 | 32 | 120 | 9.7 |
| PEE14 | —(CH$_2$)$_6$— | —(CH$_2$)$_4$— | Phenyl group | Phenyl group | 550 | 53 | 105 | 9.7 |
| PEE15 | —(CH$_2$)$_6$— | —(CH$_2$)$_4$— | Phenyl group | Phenyl group | 550 | 43 | 135 | 9.7 |
| PEE16 | —(CH$_2$)$_6$— | —(CH$_2$)$_4$— | Phenyl group | Phenyl group | 550 | 43 | 105 | 9.7 |
| PEE17 | —(CH$_2$)$_6$— | —(CH$_2$)$_4$— | Phenyl group | Phenyl group | 550 | 43 | 150 | 9.7 |
| PEE18 | —(CH$_2$)$_6$— | —(CH$_2$)$_4$— | Phenyl group | Phenyl group | 550 | 43 | 95 | 9.7 |

When the resin composition according to the present embodiment contains a plasticizer, the content of it in the total amount of the resin composition is not particularly limited. The content in the total amount of the resin composition is 10% by mass or less (preferably, 5% by mass or less) because such a content facilitates production of a resin molded product having an improved tensile elongation at break while having a less reduced modulus in tension even if it contains the plasticizer.

Because of the above-described reason, the plasticizer content may be 0 wt %. The term "0% by mass" as used herein means that the resin composition does not contain any of the other components. When the plasticizer content falls within the above-described range, bleeding of the plasticizer can easily be suppressed.

(Components other than Plasticizer)

The resin composition according to the embodiment may further contain components other than the above-described ones, if necessary. Examples of the other components include flame retardants, compatibilizers, antioxidants, mold release agents, light resistant agents, weather resistant agents, colorants, pigments, modifiers, drip preventing agents, antistatic agents, hydrolysis inhibitors, fillers, and reinforcing agents (glass fiber, carbon fiber, talc, clay, mica, glass flake, milled glass, glass bead, crystalline silica, alumina, silicon nitride, aluminum nitride, boron nitride, and the like).

Further, a component (additive) such as acid acceptor for preventing release of acetic acid or a reactive trapping agent may be added, if necessary. Examples of the acid acceptor include oxides such as magnesium oxide and aluminum oxide, metal hydroxides such as magnesium hydroxide, calcium hydroxide, aluminum hydroxide, and hydrotalcite, calcium carbonate, and talc.

Examples of the reactive trapping agent include epoxy compounds, acid anhydride compounds, and carbodiimide.

The content of each of these components preferably ranges from 0% by mass to 5% by mass or less, based on the total amount of the resin composition. The term "0% by mass" as used herein means that the resin composition does not contain any of the other components.

The resin composition according to the present embodiment may contain a resin other than the above-described resins (cellulose acetate propionate and polyhydroxyalkanoate). When the other resin is contained, the content of the other resin based on the total amount of the resin composition is 5% by mass or less, preferably less than 1% by mass. It is more preferred that the resin composition does not contain the other resin (meaning, 0% by mass).

As the other resin, for example, conventionally known thermoplastic resins can be mentioned. Specific examples include polycarbonate resins, polypropylene resins, polyester resin, polyolefin resins, polyester carbonate resins, polyphenylene ether resins, polyphenylene sulfide resins, polysulfone resins, polyether sulfone resins, polyarylene resins, polyetherimide resins, polyacetal resins, polyvinyl acetal resins, polyketone resins, polyether ketone resins, polyether ether ketone resins, polyaryl ketone resins, polyether nitrile resins, liquid crystal resins, polybenzimidazole resins, polyparabanic acid resins, vinyl-based polymers or vinyl-based copolymers obtained by polymerizing or copolymerizing one or more vinyl monomers selected from the group consisting of aromatic alkenyl compounds, methacrylic acid esters, acrylic acid esters, and vinyl cyanide compounds; diene-aromatic alkenyl compound copolymers, vinyl cyanide-diene-aromatic alkenyl compound copolymers, aromatic alkenyl compound-diene-vinyl cyanide-N-phenylmaleimide copolymers, vinyl cyanide-(ethylene-diene-propylene (EPDM))-aromatic alkenyl compound copolymers, vinyl chloride resins, and chlorinated vinyl chloride resins. Additional examples include core-shell type butadiene-methyl methacrylate copolymers. These resins may be used either singly or in combination of two or more of them.

[Process for Producing Resin Composition]

The resin composition according to the present embodiment has, for example, a step of preparing a resin composition containing the cellulose acetate propionate and the polyhydroxyalkanoate.

The resin composition according to the present embodiment is produced by melting and kneading a mixture containing the cellulose acetate propionate and the polyhydroxyalkanoate and, if necessary, the plasticizer, and the other component. Alternatively, the resin composition according to the present embodiment is produced, for example, by dissolving the above-described components in a solvent.

A known means can be used for melting and kneading and specific examples include a twin screw extruder, a Henschel mixer, a Bunbury mixer, a single screw extruder, a multi-screw extruder, and a cokneader.

<Resin-molded Product>

A resin molded product according to the present embodiment contains the resin composition according to the present embodiment. This means that the resin molded product according to the present embodiment has the same composition as that of the resin composition according to the present embodiment.

A molding or forming method for obtaining the resin molded product according to the present embodiment is preferably injection molding because it has a high degree of freedom in shape. In this point, the resin molded product is preferably an injection molded product obtained by injection molding.

A cylinder temperature in the injection molding, for example, ranges from 200° C. to 300° C., preferably ranges from 240° C. to 280° C. A mold temperature in injection molding, for example, ranges from 40° C. to 90° C., more preferably ranges from 60° C. to 80° C.

The injection molding may be performed using a commercially available apparatus, for example, NEX500, a product of Nissei Plastic Industrial, NEX150, a product of Nissei Plastic Industrial, NEX70000, a product of Nissei Plastic Industrial, PNX40, a product of Nissei Plastic Industrial, and SE50D, a product of Sumitomo Kikaisha.

The molding or forming method for obtaining the resin molded product according to the present embodiment is not limited to the above-described injection molding. For example, extrusion, blow molding, hot pressing, calendering, coating forming, casting extrusion, dip forming, vacuum forming, or transfer molding may be used.

The resin molded product according to the present embodiment is suited for use in applications such as electronic or electric devices, business machines, household electric appliances, automobile interior materials, and containers. More specifically, it may be used in housings of electronic or electric devices or household electric appliances; various components of electronic or electric devices or household electric appliances; interior components of automobiles; storage cases of CD-ROM, DVD, or the like; food containers; drink bottles; food trays; wrapping materials; films; and sheets.

EXAMPLES

The present invention will hereinafter be described more specifically by Examples, but the present invention is not limited to these Examples. All the designations "part" or "parts" refer to "part by weight" or "parts by weight" unless otherwise particularly specified.

<Provision of Cellulose Acetate Propionate> (Provision of Cellulose Acetate Propionates (CAP1 to CAP3))

The following three commercially-available cellulose acetate propionates were provided.

As the cellulose acetate propionate (CAP1), the cellulose acetate propionate (CAP2), and the cellulose acetate propionate (CAP3), CAP-482-0.5, CAP504-0.2, and CAP482-20 were provided, respectively (each, product of Eastman Chemical).

(Synthesis of Cellulose Acetate Propionate (CAP4))

Acylation: A reactor was charged with 3 parts of powdered cellulose ("KC FLOCK W50", product of NIPPON PAPER Chemicals), 0.15 parts of sulfuric acid, 30 parts of acetic acid, 0.09 parts of acetic anhydride, and 1.5 parts of propionic anhydride and the resulting mixture was stirred at 20° C. for 4 hours.

Washing: After completion of the stirring, the reaction mixture was washed with pure water by using a filter press ("SF(PP)", product of Kurita Machinery) until its electric conductivity reached 50 µS or less, and then dried.

Post treatment: After 0.2 parts of calcium acetate and 30 parts of pure water were added to 3 parts of the white powders obtained by drying. The resulting mixture was stirred at 25° C. for 2 hours and then, filtered. The powders thus obtained were dried at 60° C. for 72 hours to obtain about 2.5 parts of cellulose acetate propionate (CAP4).

(Synthesis of Cellulose Acetate Propionate (CAP5))

In a manner similar to that of Synthesis of (CAP4) except that the amount of propionic anhydride used for acylation was changed from 1.5 parts to 4 parts, cellulose acetate propionate (CAP5) was obtained.

<Provision of Cellulose Acetate> (Provision of Cellulose Acetate (CA1))

Commercially available cellulose acetate ("L50", product of Daicel) was provided as cellulose acetate (CA1).

<Provision of Cellulose Acetate Butyrate> (Provision of Cellulose Acetate Butyrate (CAB1))

Commercially available cellulose acetate butyrate ("CAB-381-20", product of Eastman Chemical) was provided as cellulose acetate butyrate (CAB1).

<Determination of Weight Average Molecular Weight and Acetyl and Propionyl Contents>

The weight average molecular weight of the cellulose acetate propionate and the acetyl and propionyl contents in the cellulose acetate propionate were determined in accordance with the above-described methods, respectively.

Determination results of the weight average molecular weight (Mw) of the cellulose acetate propionate and the acetyl and propionyl contents in the cellulose acetate propionate are collectively shown in Table 1. The determination results of the weight average molecular weight (Mw) of the cellulose acetate and the acetyl content in the cellulose acetate are collectively shown in Table 4.

TABLE 4

| | Acetyl group (Ac group) (% by mass) | Propionyl group (Pr group) (% by mass) | Butyryl group (Bu group) (% by mass) | Hydroxyl group (% by mass) | Ac/Pr ratio $(M_{Ac})/(M_{Pr})$ |
|---|---|---|---|---|---|
| CAP1 | 2.5 | 45 | | 2.5 | 0.056 |
| CAP2 | 0.6 | 42.5 | | 5 | 0.014 |
| CAP3 | 1.3 | 48 | | 1.7 | 0.027 |
| CAP4 | 2 | 38 | | 4 | 0.053 |
| CAP5 | 1.5 | 52 | | 0.9 | 0.029 |
| CA1 | 39.8 | 0 | | 3.5 | — |
| CAB1 | 13.5 | 0 | 37 | 1.8 | — |

<Provision of Polyhydroxyalkanoate> (Provision of Polyhydroxyalkanoates (HA1) to (HA4))

As polyhydroxyalkanoates (HA1) to (HA4), the following commercially-available products were provided.

As the polyhydroxyalkanoate (HA1), polyhydroxyalkanoate (HA2), and polyhydroxyalkanoate (HA3), AONILEX X131A, AONILEX X151A, and AONILEX X331N were used, respectively (each, product of Kaneka).

As the polyhydroxyalkanoate (HA4), BIOPOL (Zeneca) was used.

The weight average molecular weight of each of the polyhydroxyalkanoates thus provided and a copolymerization percentage (mol %) of the hydroxyhexanoate in the polyhydroxyalkanoate are collectively shown in Table 5.

TABLE 5

| Polyhydroxy-alkanoate No. | Kind | Weight average molecular weight (Mw) | Hexanoate copolymerization percentage |
|---|---|---|---|
| HA1 | Hydroxybutyrate hexanoate | 600 thousand | 6 mol % |
| HA2 | Hydroxybutyrate hexanoate | 600 thousand | 11 mol % |
| HA3 | Hydroxybutyrate hexanoate | 400 thousand | 6 mol % |
| HA4 | Hydroxybutyrate | 400 thousand | 0 mol % |

<Provision of other Additives> (Provision of other Additives (AD1) to (AD3))

As the other additives, the following plasticizers were provided.

mass of the cellulose acylate (100 parts by mass of the cellulose acetate propionate, 100 parts by mass of the cellulose acetate, or 100 parts by mass of the cellulose acetate butyrate).

The pellets thus obtained were injection molded into an ISO multi-purpose dumbbell (10 mm wide×4 mm thick at a measured site thereof) by using an injection molding machine ("NEX140III", product of Nissei Plastic Industrial) at a cylinder temperature not allowing an injection peak pressure to exceed 180 MPa.

[Evaluation]—Tensile Elongation at Break and Modulus in Tension—

The tensile elongation at break and modulus in tension of the ISO multi-purpose dumbbell thus obtained were determined by a method based on ISO527 by using a universal testing device ("Autograph AG-Xplus", product of Shimadzu).

The results are collectively shown in Table 6.

TABLE 6

| | Composition (amount: part by mass) | | | | | | Cylinder Temp. (° C.) | | Tensile elongation at break | Modulus in tension |
|---|---|---|---|---|---|---|---|---|---|---|
| | AC(A) | PHA(B) | | Mass ratio | Other additives | | | Injection | | |
| Division | Kind | Kind | Amount | (B)/(A) | Kind | Amount | Kneading | molding | (%) | (MPa) |
| Ex. 1 | CAP1 | HA1 | 30 | 0.3 | | | 210 | 220 | 30 | 2600 |
| Ex. 2 | CAP1 | HA1 | 100 | 1.0 | | | 200 | 210 | 35 | 2500 |
| Ex. 3 | CAP1 | HA1 | 20 | 0.2 | | | 210 | 220 | 30 | 2800 |
| Ex. 4 | CAP1 | HA1 | 400 | 4.0 | | | 180 | 190 | 40 | 2400 |
| Ex. 5 | CAP1 | HA2 | 30 | 0.3 | | | 200 | 210 | 66 | 2400 |
| Ex. 6 | CAP1 | HA3 | 30 | 0.3 | | | 200 | 210 | 26 | 2600 |
| Ex. 7 | CAP2 | HA1 | 30 | 0.3 | | | 210 | 220 | 24 | 2700 |
| Ex. 8 | CAP3 | HA1 | 30 | 0.3 | | | 210 | 220 | 26 | 2600 |
| Ex. 9 | CAP1 | HA1 | 30 | 0.3 | AD1 | 10 | 200 | 210 | 24 | 2200 |
| Ex. 10 | CAP1 | HA1 | 30 | 0.3 | AD2 | 10 | 200 | 210 | 22 | 2200 |
| Ex. 11 | CAP1 | HA1 | 30 | 0.3 | AD3 | 10 | 200 | 210 | 36 | 2400 |
| Ex. 12 | CAP1 | HA4 | 30 | 0.3 | | | 220 | 230 | 22 | 2800 |
| Ex. 13 | CAP1 | HA1 | 50 | 0.5 | | | 200 | 210 | 33 | 2600 |
| Ex. 14 | CAP1 | HA1 | 200 | 2.0 | | | 200 | 210 | 36 | 2500 |
| Ex. 15 | CAP1 | HA1 | 300 | 3.0 | | | 190 | 200 | 38 | 2400 |
| Comp. Ex. 1 | CAP4 | HA1 | 30 | 0.3 | | | 210 | 220 | 16 | 2200 |
| Comp. Ex. 2 | CAP5 | HA1 | 30 | 0.3 | | | 210 | 220 | 14 | 2400 |
| Comp. Ex. 3 | CA1 | HA1 | 30 | 0.3 | | | 240 | 250 | 5 | 3200 |
| Comp. Ex. 4 | CAP1 | HA1 | 15 | 0.15 | | | 220 | 230 | 10 | 2800 |
| Comp. Ex. 5 | CAP1 | HA1 | 420 | 4.2 | | | 200 | 210 | 45 | 1600 |
| Comp. Ex. 6 | CAP3 | HA2 | 5 | 0.05 | AD1 | 15 | 190 | 190 | 50 | 1200 |
| Comp. Ex. 7 | CAB1 | HA1 | 30 | 0.3 | | | 180 | 190 | 35 | 1500 |
| Comp. Ex. 8 | CAP1 | | | | | | 240 | 240 | 4 | 2200 |
| Comp. Ex. 9 | | HA1 | 100 | | | | 150 | 150 | 10 | 1200 |

As a plasticizer (AD1), a plasticizer (AD2), and a plasticizer (AD3), a commercially available composition containing adipic acid ester ("Daifatty 101", product of Daihachi Chemical), a polyether ester compound ("RS-1000", product of ADEKA), and diethylhexyl adipate (reagent, product of Tokyo Kaseisha) were provided, respectively.

Examples 1 to 15, Comparative Examples 1 to 9

Kneading and Injection Molding

A resin composition (pellets) was obtained by charging the components at a composition percentage as shown in Table 6, adjusting a cylinder temperature as shown in Table 3, and kneading the resulting mixture in a twin-screw kneader ("TEX41SS" product of Toshiba Machine). The composition percentage is an amount based on 100 parts by In Table 6, "AC" and "PHA" represent a cellulose acylate and a polyhydroxyalkanoate, respectively.

The above-described results suggest that evaluation results of modulus in tension and tensile elongation at break in Examples are superior to those in Comparative Examples.

What is claimed is:
1. A resin composition, comprising:
   a cellulose acetate propionate including a propionyl group and an acetyl group; and
   a polyhydroxyalkanoate,
   wherein a mass ratio (B)/(A) ranges from 0.2 to 4, wherein (B) represents a content of the polyhydroxyalkanoate in a total amount of the resin composition and (A) represents a content of the cellulose acetate propionate in the total amount of the resin composition,
   a content ($M_{Pr}$) of the propionyl group in the cellulose acetate propionate ranges from 39% by mass to 51% by mass, and a mass ratio ($M_{Ac}$)/($M_{Pr}$) of a content ($M_{Ac}$) of the acetyl group in the cellulose acetate propionate to the content of the propionyl group in the cellulose acetate propionate ranges from 0.056 to 0.07.

2. The resin composition according to claim 1,
wherein the polyhydroxyalkanoate is a copolymer of two or more species of hydroxyalkanoates.

3. The resin composition according to claim 1,
wherein the polyhydroxyalkanoate is a copolymer of 3-hydroxybutyrate and 3-hydroxyhexanoate.

4. The resin composition according to claim 3,
wherein a composition ratio of the 3-hyroxyhexanoate to the copolymer of the 3-hydroxybutyrate and the 3-hydroxyhexanoate ranges from 3 mol % to 20 mol %.

5. The resin composition according to claim 1,
wherein a total content of the cellulose acetate propionate and the polyhydroxyalkanoate is 90% by mass or more based on the total amount of the resin composition.

6. The resin composition according to claim 1,
wherein a total content of the cellulose acetate propionate and the polyhydroxyalkanoate is 100% by mass based on the total amount of the resin composition.

7. The resin composition according to claim 1,
wherein the polyhydroxyalkanoate has a weight average molecular weight ranging from 10000 to 1000000.

8. The resin composition according to claim 1, further comprising a plasticizer.

9. The resin composition according to claim 8, wherein the plasticizer is a composition containing an adipic acid ester.

10. The resin composition according to claim 8,
wherein a content of the plasticizer is 10% by mass or less based on the total amount of the resin composition.

11. A resin molded product obtained by molding the resin composition according to claim 1.

12. The resin molded product according to claim 11, wherein the resin molded product is an injection molded product.

* * * * *